United States Patent [19]

Wilcox et al.

[11] 4,162,343

[45] Jul. 24, 1979

[54] MULTILAYER LIGHT-REFLECTING FILM

[75] Inventors: Forrest S. Wilcox, Montrose; Jules Pinsky, Scarborough; Scott A. Cooper, Yorktown Heights, all of N.Y.

[73] Assignee: The Mearl Corporation, Ossining, N.Y.

[21] Appl. No.: 863,800

[22] Filed: Dec. 23, 1977

[51] Int. Cl.² .................... G02B 1/10; G02B 5/28; B32B 27/30; B32B 27/32
[52] U.S. Cl. .................... 428/212; 156/244.11; 350/164; 350/166; 428/213; 428/518; 428/520; 428/523; 428/30; 428/913; 264/171
[58] Field of Search .................. 428/30, 212, 213, 516, 428/518, 520, 522, 523, 913; 350/166, 164; 156/244.11; 264/171

[56] References Cited

U.S. PATENT DOCUMENTS

| | | | |
|---|---|---|---|
| 3,442,755 | 5/1969 | Walters et al. | 428/30 X |
| 3,480,502 | 11/1969 | Schrenk | 428/7 |
| 3,549,405 | 12/1970 | Schrenk et al. | 350/164 X |
| 3,565,985 | 2/1971 | Schrenk et al. | 350/166 X |
| 3,576,707 | 4/1971 | Schrenk et al. | 350/166 X |
| 3,647,612 | 3/1972 | Schrenk et al. | 264/171 X |
| 3,711,176 | 1/1973 | Alfrey et al. | 350/166 |
| 3,759,647 | 9/1973 | Schrenk et al. | 264/171 X |
| 3,767,523 | 10/1973 | Eckhard et al. | 428/520 X |
| 3,817,821 | 6/1974 | Gallini | 428/516 X |
| 4,076,570 | 2/1978 | Medley et al. | 156/244.11 |

*Primary Examiner*—Harold Ansher
*Attorney, Agent, or Firm*—Ostrolenk, Faber, Gerb & Soffen

[57] ABSTRACT

A multilayer coextruded light-reflecting film is improved by utilizing a mixture of a polyolefin and ethylenevinyl acetate as one of the diverse resinous material which form the plurality of layers.

16 Claims, No Drawings

MULTILAYER LIGHT-REFLECTING FILM

BACKGROUND OF THE INVENTION

The present invention relates to multilayer coextruded light-reflecting films which have a narrow reflection band because of light interference. When the reflection band occurs within the range of visible wavelength, the film is iridescent. Similarly, when the reflection band falls outside the range of visible wavelength, the film is either ultraviolet or infrared reflecting.

The multilayer films and methods by which they can be produced are known in the art. In this connection, the reader's attention is directed to the following United States patents which are hereby incorporated by reference: U.S. Pat. Nos. 3,328,003; 3,442,755; 3,448,183; 3,479,425; 3,480,502; 3,487,505; 3,511,903; 3,549,405; 3,555,128; 3,557,265; 3,565,985; 3,576,707; 3,647,612; 3,711,176; 3,759,647; 3,773,882; and 3,801,429.

The multilayer films are composed of a plurality of generally parallel layers of transparent thermoplastic resinous material in which the contiguous adjacent layers are of diverse resinous material whose index of refraction differs by at least about 0.03. The films contain at least 10 layers and more usually at least 50 layers and, preferably, at least about 90 layers.

The individual layers of the film are very thin, usually in the range of about 30 to 500 nm, preferably about 50–400 nm, which causes constructive interference in light waves reflected from the many interfaces. Depending on the layer thickness and the refractive index of the polymers, one dominant wavelength band is reflected and the remaining light is transmitted through the film. The reflected wavelength is proportional to the sum of the optical thicknesses of a pair of layers. The reflected wavelength can be calculated by the formula $$\lambda_M = M/2 \, (n_1 t_1 + n_2 t_2)$$

In this formula, $\lambda$ is the reflected wavelength, M is the order of reflection, t is the layer thickness, n is the refractive index, and 1 and 2 indicate the polymer of the first layer and the polymer of the second layer, respectively. The quantity nt is the optical thickness of a layer. For first order reflections, i.e. when M is 1, visible light is reflected when the sum of optical thicknesses falls between about 200 and 350 nm. When the sum is lower than about 200, the reflection is in the ultraviolet region of spectrum and when the sum is greater than about 350 nm, the reflection is in the infrared region.

The quantity of the reflected light (reflectance) and the color intensity depend on the difference between the two refractive indexes, on the ratio of optical thicknesses of the layers, on the number of layers and on the uniformity of the thicknesses. If the refractive indexes are the same, there is no reflection at all from the interfaces between the layers. In the multilayer films, the refractive indexes of contiguous adjacent layers differ by at least 0.03 and preferably by at least 0.06 or more. For first order reflections, reflectance is highest when the optical thicknesses of the layers are equal although suitably high reflectances can be achieved when the ratio of the two optical thicknesses falls between 5:95 and 95:5. Distinctly colored reflections are obtained with as few as 10 layers, however, for maximum color intensity it is desired to have between 50 and 1000 or even more layers. High color intensity is associated with a reflection band which is relatively narrow and which has high reflectance at its peak. It should be recognized that although the term "color intensity" has been used here for convenience, the same considerations apply to the invisible reflection in the ultraviolet and infrared ranges.

The chill roll multilayer cast films are made using a conventional single manifold flat film die in combination with a feedblock which collects the melts from each of two or more extruders and arranges them into the desired layer pattern. Feedblocks are described in the aforementioned U.S. Pat. Nos. 3,565,985 and 3,773,882. The feedblocks can be used to form alternating layers of either two components (i.e. ABAB . . . ) or three components (ABCABCA . . . ) or more. The very narrow multilayer stream flows through a single manifold flat film die where the layers are simultaneously spread to the width of the die and thinned to the final die exit thickness. The number of layers and their thickness distribution can be changed by inserting a different feedport module.

In order to achieve good control of layer uniformity, the outside surface or skin layers should be thicker than the intermediate optical layers. If the skin layers are too thin, some of the interfaces of the optical layers can be subjected to high shear stress resulting in interfacial instability which disrupts the regular laminar flow of the optical layers. It is therefore necessary for the surface skins to be thick enough to prevent interfacial instability at the layer interfaces. It has been found that the two skin layers should together have a thickness which is at least 5% of the thickness of the multilayer core and can be up to several times the thickness of the multilayer core. It is normally not desirable for the total skin thickness to be more than three times that of the multilayer core for economic reasons.

A wide variety of transparent, plastic resinous material can be used to form the layers of the multilayer light-reflecting film. Some usable polymers and their refractive index are set forth in the following Table.

TABLE 1

| Polymer name: | Refractive index |
|---|---|
| Polytetrafluoroethylene | 1.35 |
| FEP (fluorinated ethylene-propylene copolymer) | 1.34 |
| Polyvinylidenefluoride | 1.42 |
| Polychlorotrifluoroethylene | 1.42 |
| Polybutyl acrylate | 1.46 |
| Polyvinyl acetate | 1.47 |
| Ethyl cellulose | 1.47 |
| Polyformaldehyde | 1.48 |
| Polyisobutyl methacrylate | 1.48 |
| Polybutyl methacrylate | 1.48 |
| Polymethyl acrylate | 1.48 |
| Polypropyl methacrylate | 1.48 |
| Polyethyl methacrylate | 1.48 |
| Polymethyl methacrylate | 1.49 |
| Cellulose acetate | 1.49 |
| Cellulose propionate | 1.49 |
| Cellulose acetate-butyrate | 1.49 |
| Cellulose nitrate | 1.49 |
| Polyvinyl butyral | 1.49 |
| Polypropylene | 1.49 |
| Low density polyethylene (branched) | 1.51 |
| Polyisobutylene | 1.51 |
| Natural rubber | 1.52 |
| Perbunan | 1.52 |
| Polybutadiene | 1.52 |
| Nylon (condensation copolymer of hexamethylene-diamine and adipic acid) | 1.53 |
| Polyvinyl chloroacetate | 1.54 |
| Polyvinylchloride | 1.54 |

TABLE 1-continued

| Polymer name: | Refractive index |
| --- | --- |
| Polyethylene (high density linear) | 1.54 |
| A copolymer of 67 parts by weight methyl methacrylate and 33 parts by weight styrene | 1.54 |
| A copolymer of 85 parts by weight vinyl chloride and 15 parts by weight vinylidene chlorride | 1.55 |
| Poly-α-methylstyrene | 1.56 |
| A copolymer of 60 parts by weight styrene and 40 parts by weight butadiene | 1.56 |
| Neoprene | 1.56 |
| A copolymer of 70 parts by weight styrene and 30 parts by weight acrylonitrile | 1.57 |
| Polycarbonate resin | 1.59 |
| Polystyrene | 1.60 |
| A copolymer of 85 parts by weight vinylidene chloride and 15 parts by weight vinyl chloride | 1.61 |
| Polydichlorostyrene | 1.62 |

The use of polyolefins as one of the diverse resinous materials in the multilayer light-reflecting film has been found advantageous. These polymers, such as low density polyethylene, high density polyethylene, propyleneethylene copolymer, polypropylene homopolymer, and the like, have refractive indexes which are approximately midway between low index polymers such as the fluorine-containing polymers and high index polymers such as polystyrene, polycarbonate, vinylidene chloride copolymer and the like. Therefore, the necessary 0.03 refractive index difference can be established in either direction. Additionally, when used with the relatively brittle polystyrene, the polyolefin imparts desirable flexibility and toughness which makes it possible to wind the film on rolls with less difficulty and to feed it into continuous film handling and converting equipment.

Unfortunately, there are disadvantages inherent in polyolefin containing film. The adhesion forces between the layers of polyolefin and the adjacent polymer are rather small. As a result, under some conditions of use such as, for example, after laminating the multilayer film to a substrate such as paper, paperboard, plastic film or sheet or the like, the multilayer film shows some tendency to internal delamination. Additionally, in forming the film, the skin layer and multilayer core fail to uniformly spread from the original very compact stream, typically about 2.5 cm in cross-section, to the full width of the die which can be as wide as 120 cm or greater. As a result, the skin layers are generally thicker at the edges of the wide film than at the center of the film even though the total thickness of the cast film is kept uniform from edge to center in order to facilitate winding and handling. It will be appreciated that this results in the multilayer core being compressed at the edges of the film with respect to the center and since the number of layers remains constant, the individual layers are thinner at the edges of the film.

An iridescent film which suffers from this defect may be, for example, red-reflecting in the center and blue- or violet-reflecting at the edges because of the differences in optical layer thicknesses. If the film is to be used for decorative purposes, it is most often desired to have the same color reflecting characteristics throughout. If the film is to be used for applications requiring ultraviolet or infrared reflection, it is important that the entire area have the same reflection characteristics.

Accordingly, it is the object of this invention to provide a solution to the two problems just described with respect to polyolefin-containing film, i.e. the inadequate adhesion between layers and the lack of uniform thickness from center to edge of the film. This and other objects of the invention will become apparent to those skilled in this art from the following detailed description.

SUMMARY OF THE INVENTION

This invention relates to polyolefin-containing multilayer light-reflecting film and more particularly to such film having enhanced interlayer adhesion and uniform layer thickness in which the polyolefin is admixed with ethylene vinyl acetate.

DESCRIPTION OF THE INVENTION

It has been found that the admixture of ethylene vinyl acetate (EVA) with the polyolefin has the effect of improving the internal adhesion of the multilayer film and also has the effect of making the skin layers and multilayer core substantially uniform in thickness so that the structure corresponds closely to the ideal structure of perfectly uniform layers. The EVA can be admixed with the polyolefin in any convenient manner according to conventional procedures. Amounts of EVA from about 3% to 40% based on the weight of the polyolefin has been found to be effective and the best results have been obtained with about 10% to 20% EVA. At the higher concentrations, the presence of EVA in the polyolefin introduces a degree of haze.

The unexpected effect of EVA in increasing the uniformity of the layers cannot be explained on the basis of nominal melt flow rate or viscosity. The EVA-polyolefin mixtures used in this invention have a higher nominal melt flow rate or lower viscosity than the polyolefin alone. If, however, a different polyolefin grade with a nominal melt flow rate comparable to that of the EVA-polyolefin mixture is used, no improvement in film uniformity is realized. Accordingly, the contribution of the EVA cannot be explained simply in terms of viscosity.

It will be appreciated that the EVA-polyolefin admixture is one of the diverse resinous materials used in forming the multilayer film and may or may not be the resinous material used to form the skin layers. In the preferred embodiments of this invention, at least one and most preferably both of the skin layers are formed using the EVA-polyolefin admixture.

There are applications for which an additional skin layer, composed of a third polymer, is desirable. For example, a film formed from polypropylene/polystyrene is superior to a film formed from low density polyethylene/polystyrene in certain applications because of its greater stiffness and better clarity. On the other hand, low density polyethylene yields a superior surface skin because it responds more effectively than polypropylene to treatments, e.g. arc discharge, to improve its suitability for printing and laminating. A combination of the desirable characteristics of these two systems can be achieved by producing a second skin layer of low density polyethylene over the skin layer in a polypropylene/polystyrene multilayer film. The improvement in uniformity achieved in accordance with this invention can be obtained by incorporating the EVA into either the polypropylene or low density polyethylene and a further improvement, yielding substantially uniform optical layers, can be obtained when the EVA is incorporated into both of these polymers. If desired, the third component can be supplied as a second skin to only one surface of the multilayer film. The thickness of the second skin should meet the characteristics of the thickness of the first skin, i.e., greater than the thickness of any individual core layer and at least 5% of the core thickness.

In order to further illustrate the present invention, various examples are set forth below. Throughout this specification and claims, all temperatures are in degrees Centigrade and all parts and percentages are by weight unless otherwise specified.

EXAMPLE 1

Propylene-ethylene copolymer was fed to the feedblock from one extruder and polystyrene was fed to the feedblock from a second extruder to form a 0.6 mil thick, 115 optical layer and two skin layer film. The optical thicknesses of the alternating propylene-ethylene copolymer (Refractive Index 1.49) and polystyrene (Refractive Index 1.60) thin layers (about 0.004 mil each) were equal and the thick copolymer skin layers together were about 20% of the thickness of the total film. A 112 cm die was used to produce a 90 cm wide film of uniform overall thickness.

Examined by reflected light at perpendicular incidence, the film exhibited a wide band down its center which was weakly red-reflecting and narrow bands along both edges which reflected violet-blue. Adjacent to either side of the center band was a band which was primarily bright orange-red. Between these and the edge bands were regions which reflected primarily green. Thus, the sequence from edge to center was violet-blue, green, orange-red and weak red.

EXAMPLE 2

The procedure of Example 1 was repeated except that instead of the copolymer, an admixture of 15% EVA and 85% copolymer (Refractive Index 1.50) was used. The resulting film was greatly improved in uniformity and reflected primarily bright red across its entire width.

EXAMPLE 3

Following the procedure of Example 1, a low density polyethylene/polystyrene film was produced. The film was 0.7 mil thick and had two low density polyethylene skin layers which together were about 50% of the total thickness of the film. The optical thickness of the low density optical layers was three times that of the polystyrene layers.

At perpendicular incidence, the center band was primarily green by reflection and the edge bands were colorless. The regions in between the center and edges were primarily violet and blue.

EXAMPLE 4

The procedure of Example 3 was repeated except that the low density polyethylene was replaced by a mixture of 20% EVA and 80% low density polyethylene. The resulting film, examined by perpendicularly incident light, was very uniform and reflected primarily green-blue across its entire width.

EXAMPLE 5

A polypropylene/polycarbonate film was prepared having polypropylene as the skin layers, which together averaged 10% of the total film thickness. The optical thickness of the polypropylene optical layers was three times that of the polycarbonate optical layers. The overall film thickness was 0.4 mil.

The resulting film, examined by perpendicularly incident light, exhibited a center band which was primarily green-reflecting, edge bands which were primarily violet-reflecting, and intermediate regions which were primarily blue-reflecting.

EXAMPLE 6

Example 5 was repeated replacing the polypropylene with a mixture of 10% EVA and 90% polypropylene. The resulting film reflected primarily blue-green across its entire width, except for the edges which were blue. The color variation was, nevertheless, much smaller than in Example 5.

EXAMPLE 7

A polypropylene homopolymer/polyvinylidene fluoride film was prepared having polypropylene as the skin layers, which together averaged 40% of the total film thickness. The optical thickness of the polypropylene optical layers was four times that of the polyvinylidene fluoride optical layers. The overall film thickness was 0.7 mil.

The resulting film, examined by perpendicularly incident light, was violet at the edges, with the color across the film varying from blue to green and finally to red at the center.

EXAMPLE 8

Example 7 was repeated replacing the polypropylene with a mixture of 10% EVA and 90% polypropylene. The film was primarily yellow-green across its entire width, except for blue to blue-green at the edges.

Various changes and modifications can be made in the process and products of this invention without departing from the spirit and scope thereof. The various embodiments described herein were for the purpose of illustration only and were not intended to limit the invention. For example, although the working Examples deal with first order films, it will be understood that the same conditions prevail with thicker films of higher order. Without EVA in the polyolefin, the wavelength of the reflected light from the edges of the film correspond to a smaller optical thickness than that from the center of the film. Using the EVA, the reflective wavelength is made substantially uniform from edge to center.

We claim:

1. A transparent thermoplastic resinous film of at least 10 substantially uniformly thick layers comprising a core having a pair of generally parallel surface layers thereon, said core comprising a plurality of generally parallel layers, said surface and core layers being of transparent thermoplastic resinous material in which the contiguous adjacent layers are of diverse resinous material differing in refractive index by at least about 0.03, each surface layer being of greater thickness than any of the core layers and the combined thickness of the surface layers being at least 5% of the thickness of said core, wherein at least one of said diverse resinous materials is a mixture of polyolefin and ethylene vinyl acetate.

2. The transparent thermoplastic resinous film of claim 1 having at least 50 layers wherein said difference in refractive index is at least about 0.06.

3. The transparent thermoplastic resinous film of claim 1 having at least 90 layers wherein said mixture contains 3% to 40% ethylene vinyl acetate.

4. The transparent thermoplastic resinous body of claim 3 wherein said mixture contains 10% to 20% ethylene vinyl acetate.

5. The transparent thermoplastic resinous body of claim 1 wherein the resinous material of at least one of said surface layers is said mixture.

6. The transparent thermoplastic resinous film of claim 5 wherein said resinous material of both surface layers is said mixture.

7. The transparent thermoplastic resinous body of claim 1 further comprising an overlying layer on each of said surface layers wherein said overlying layer comprises a polyolefin, is thicker than any of said core layers and wherein the combined thickness of said overlying layers is at least 5% of the thickness of said core.

8. The transparent thermoplastic resinous film of claim 7 wherein at least one of said overlying layers is a mixture of polyolefin and ethylene vinyl acetate.

9. The transparent thermoplastic resinous film of claim 1 wherein said core layers are polystyrene and propylene-ethylene copolymer-ethylene vinyl acetate, said surface layers are propylene-ethylene copolymer-ethylene vinyl acetate.

10. The transparent thermoplastic resinous film of claim 9 further comprising an overlying layer of polyethylene-ethylene-vinyl acetate on each of said surface layers, wherein said overlying layer is thicker than any of said core layers and the combined thickness of said overlying layers is at least 5% of the thickness of said core.

11. The transparent thermoplastic resinous film of claim 1 wherein said diverse resinous material is polystyrene and polypropylene-ethylene vinyl acetate.

12. The transparent thermoplastic resinous film of claim 1 wherein said diverse resinous material is polypropylene-ethylene-vinyl acetate and polycarbonate.

13. In a process of forming a transparent thermoplastic resinous film of at least 10 generally parallel layers in which contiguous adjacent layers are of diverse resinous material differing in refractive index by at least 0.03, by coextrusion, the improvement which comprises forming each surface layer so as to be a greater thickness than any of the core layers and such that the combined thickness of the surface layers is at least 5% of the thickness of said core and forming at least one of said diverse resinous materials from a mixture of polyethylene and ethylene vinyl acetate, whereby a substantially uniform thickness of said layers is realized.

14. The method of claim 13 wherein said film has at least 50 layers, said difference in refractive index is at least about 0.06 and wherein said mixture contains 3% to 40% ethylene vinyl acetate.

15. The method of claim 14 wherein said film has at least 90 layers and said mixture contains 10% to 20% ethylene vinyl acetate.

16. The method of claim 13 wherein at least one of said surface layers is a mixture of polyolefin and ethylene vinyl acetate.

* * * * *